(12) United States Patent
Yoon et al.

(10) Patent No.: US 10,904,301 B2
(45) Date of Patent: Jan. 26, 2021

(54) CONFERENCE SYSTEM AND METHOD FOR HANDLING CONFERENCE CONNECTION THEREOF

(71) Applicant: SAMSUNG SDS CO., LTD., Seoul (KR)

(72) Inventors: Hee-Tae Yoon, Seoul (KR); Do-Hyung Im, Seoul (KR); Jun-Ho Kang, Seoul (KR); Seong-Joong Chang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 95 days.

(21) Appl. No.: 16/133,984

(22) Filed: Sep. 18, 2018

(65) Prior Publication Data
US 2019/0089753 A1 Mar. 21, 2019

(30) Foreign Application Priority Data
Sep. 18, 2017 (KR) .......................... 10-2017-0119298

(51) Int. Cl.
*H04L 12/00* (2006.01)
*H04L 29/06* (2006.01)

(52) U.S. Cl.
CPC ........ *H04L 65/403* (2013.01); *H04L 65/1069* (2013.01)

(58) Field of Classification Search
CPC .... H04L 65/1069; H04L 65/403; H04L 29/06
USPC ................................................. 709/206, 204
See application file for complete search history.

(56) References Cited

U.S. PATENT DOCUMENTS

| 5,915,091 | A | * | 6/1999 | Ludwig | G06Q 10/10 348/E7.081 |
|---|---|---|---|---|---|
| 6,658,010 | B1 | * | 12/2003 | Enns | H04H 20/42 370/401 |
| 7,640,301 | B2 | * | 12/2009 | Walter | H04N 7/152 709/204 |
| 7,792,262 | B2 | * | 9/2010 | Parker | H04M 3/56 379/202.01 |
| 8,250,142 | B2 | * | 8/2012 | AbiEzzi | H04N 7/142 709/204 |
| 8,817,668 | B2 | * | 8/2014 | Sekaran | H04L 29/06414 370/261 |
| 8,948,058 | B2 | * | 2/2015 | Ramalho | H04L 12/1818 370/260 |

(Continued)

*Primary Examiner* — Frantz Coby
(74) *Attorney, Agent, or Firm* — Sughrue Mion, PLLC

(57) ABSTRACT

A conference system and a method for handling a conference connection in the conference system are provided. The method for handling a conference connection according to one embodiment of the present disclosure includes: providing, at a web conference server, a terminal with an access link to a web conference; acquiring, at the web conference server, identification information of the terminal from the terminal connected to the web conference through the access link; processing, at an audio conference server, a connection of the terminal to an audio conference; receiving, at the web conference server, identification information of the terminal connected to the audio conference from the audio conference server; and mapping, at the web conference server, participant information of the web conference and participant information of the audio conference by comparing the identification information received from the terminal with the identification information received from the audio conference server.

18 Claims, 5 Drawing Sheets

(56) References Cited

U.S. PATENT DOCUMENTS

| | | | | |
|---|---|---|---|---|
| 9,667,686 | B2* | 5/2017 | Ramalho | H04L 12/1818 |
| 2002/0138635 | A1* | 9/2002 | Redlich | H04L 12/2856 |
| | | | | 709/229 |
| 2008/0181140 | A1* | 7/2008 | Bangor | H04L 12/1818 |
| | | | | 370/261 |
| 2011/0075820 | A1* | 3/2011 | Mikan | H04M 3/567 |
| | | | | 379/88.13 |
| 2012/0117156 | A1* | 5/2012 | Anka | H04N 7/15 |
| | | | | 709/205 |
| 2013/0027508 | A1* | 1/2013 | Charish | H04M 3/56 |
| | | | | 348/14.08 |
| 2013/0212289 | A1* | 8/2013 | Krishnakumar | H04L 12/1822 |
| | | | | 709/228 |
| 2013/0258908 | A1* | 10/2013 | Martinsen | H04L 12/1818 |
| | | | | 370/260 |
| 2013/0335513 | A1* | 12/2013 | Broadworth | H04N 7/15 |
| | | | | 348/14.08 |
| 2014/0327728 | A1* | 11/2014 | Modai | H04N 7/15 |
| | | | | 348/14.08 |
| 2018/0034887 | A1* | 2/2018 | Dunne | H04L 12/1831 |

* cited by examiner

CONFERENCE SYSTEM AND METHOD FOR HANDLING CONFERENCE CONNECTION THEREOF

CROSS-REFERENCE TO RELATED APPLICATION(S)

This application claims the benefit under 35 USC § 119(a) of Korean Patent Application No. 10-2017-0119298, filed on Sep. 18, 2017, in the Korean Intellectual Property Office, the entire disclosure of which is incorporated herein by reference for all purposes.

BACKGROUND

1. Field

The following description relates to conference connection technology in a multi-party conference system.

2. Description of Related Art

An audio conference system is a remote communication system in which two or more users access a virtual conference room using phones and simultaneously conduct a conference using voice. By participating in the audio conference, people at multiple locations can conveniently collaborate using phones.

A typical audio conference has provided only voice data transmission/reception between multiple users. However, in recent years, there is a growing demand to provide various additional services, such as document sharing, screen sharing, and sharing of writing, in the audio conference. Accordingly, attempts have been made to provide additional services to the audio conference by setting up a web conference separate from the audio conference and linking the web conference with the audio conference.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a technical means for allowing a user to connect to both an audio conference and a web conference with a single action in a conference system and synchronizing and managing participant information of the audio conference and the web conference.

In one general aspect, there is provided a method for handling a conference connection, including: providing, at a web conference server, a terminal with an access link to a web conference; acquiring, at the web conference server, identification information of the terminal from the terminal connected to the web conference through the access link; processing, at an audio conference server, a connection of the terminal to an audio conference; receiving, at the web conference server, identification information of the terminal connected to the audio conference from the audio conference server; and mapping, at the web conference server, participant information of the web conference and participant information of the audio conference by comparing the identification information received from the terminal with the identification information received from the audio conference server.

The identification information of the terminal may include one or more of a phone number, network access information, and a personal identification number (PIN) of the terminal.

The processing of the connection to the audio conference may process the connection of the terminal to the audio conference by receiving a call originated from the terminal.

The method may further include, prior to receiving the identification information of the terminal, providing access information of the audio conference to the terminal, wherein the terminal originates the call for connecting to the audio conference using the audio conference access information.

The access information of the audio conference may include one or more of an access phone number and network access information of the audio conference.

The access information of the audio conference may be provided to the terminal together with the access link to the web conference.

The processing of the connection to the audio conference may include receiving the identification information of the terminal from the web conference server, originating a call to the terminal using the received identification information of the terminal, and processing the audio conference connection of the terminal which receives the call.

In another general aspect, there is provided a method for handling a conference connection which is performed in a web conference server comprising one or more processors and a memory in which one or more programs to be executed by the one or more processors are stored, the method including: providing a first terminal with an access link to a web conference; receiving identification information of the first terminal from the first terminal that is connected to the web conference through the access link; receiving identification information of a second terminal connected to an audio conference from an audio conference server; and mapping the first terminal and the second terminal to each other to be identified as the same terminal when the identification information of the first terminal is the same as the identification information of the second terminal.

The pieces of identification information of the first terminal and the second terminal may include one or more of phone numbers, network access information, and personal identification numbers (PINs) of the first terminal and the second terminal.

The method may further include, prior to receiving the identification information of the second terminal, providing access information of the audio conference to the first terminal.

The access information of the audio conference may include one or more of an access phone number and network access information of the audio conference.

The access information of the audio conference may be provided to the first terminal together with the access link to the web conference.

The method may further include, prior to receiving the identification information of the second terminal, transmitting the acquired identification information of the first terminal to the audio conference server.

In still another general aspect, there is provided a conference system including: a web conference server configured to provide a terminal with an access link to a web conference and acquire identification information of the terminal from the terminal connected to the web conference through the access link; and an audio conference server configured to process a connection of the terminal to an audio conference and provide the identification information of the terminal connected to the audio conference to the web conference server, wherein the web conference server maps participant information of the web conference and participant information of the audio conference by comparing the identification information acquired from the terminal with the identification information provided from the audio conference server.

The identification information of the terminal may include one or more of a phone number, network access information, and a PIN of the terminal.

The audio conference server may process the connection of the terminal to the audio conference by receiving a call originated from the terminal.

The web conference server may provide the terminal with access information of the audio conference and the terminal may originate a call for connecting to the audio conference using the access information of the audio conference.

The access information of the audio conference may include one or more of an access phone number and network access information of the audio conference.

The web conference server may provide the access information of the audio conference to the terminal together with the access link to the web conference.

The audio conference server may receive the identification information of the terminal from the web conference server, originate a call to the terminal using the identification information of the terminal, and process the audio conference connection of the terminal which receives the call.

In yet another general aspect, there is provided a web conference server device including: one or more processors; a memory; and one or more programs, wherein the one or more programs are configured to be stored in the memory and executed by the one or more processors and the one or more programs include: a command for providing a first terminal with an access link to a web conference; a command for receiving identification information of the first terminal from the first terminal connected to the web conference through the access link; a command for receiving identification information of a second terminal connected to an audio conference from an audio conference server; and a command for mapping the first terminal and the second terminal to each other to be identified as the same terminal when the identification information of the first terminal is the same as the identification information of the second terminal.

The pieces of identification information of the first terminal and the second terminal may include one or more of phone numbers, network access information, and personal identification numbers (PINs) of the first terminal and the second terminal.

The one or more programs may further include a command for providing access information of the audio conference to the first terminal prior to performing the command for receiving the identification information of the second terminal.

The access information of the audio conference may include one or more of an access phone number and network access information of the audio conference.

The access information of the audio conference may be provided to the first terminal together with the access link to the web conference.

The one or more programs may further include a command for transmitting the acquired identification information of the first terminal to the audio conference server prior to performing the command for receiving the identification information of the second terminal.

Other features and aspects will be apparent from the following detailed description, the drawings, and the claims.

Figure 1:
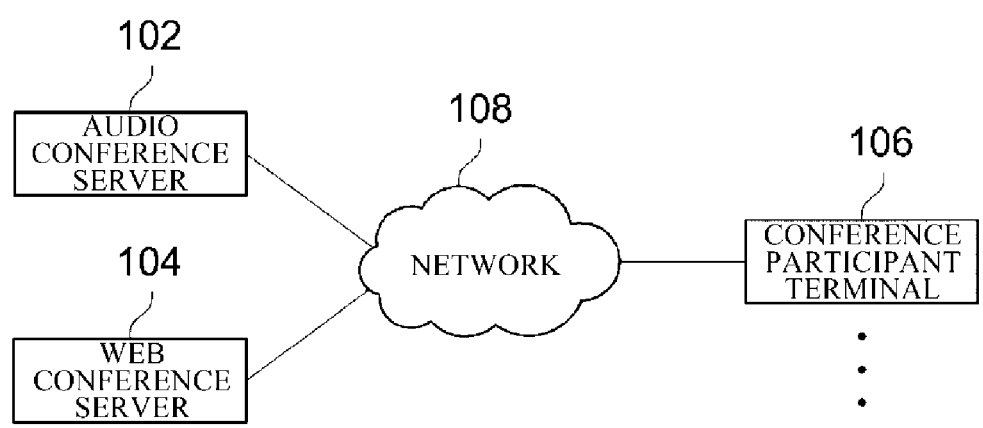
FIG. 1 is a block diagram for describing a conference system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram for describing a conference system 100 according to one embodiment of the present disclosure. As shown in FIG. 1, the conference system 100 according to one embodiment of the present disclosure includes an audio conference server 102, a web conference server 104, and one or more conference participant terminals 106.

The audio conference server 102 may be a server for providing an audio conference service between the one or more conference participant terminals 106.

The web conference server 104 is a server for providing a web conference service between the one or more conference participant terminals 106. In the disclosed embodiments, the web conference server 104 may provide various services, such as screen sharing, sharing of writing, document sharing, and the like among participants of the audio conference, in cooperation with the audio conference server 102.

The conference participant terminals 106 are terminals used by conference participants who access the audio conference server 102 and the web conference server 104 to take part in an audio conference and a web conference. In the disclosed embodiments, the conference participant terminals 106 may include all types of communication devices capable of receiving audio conference and web conference services, such as desktop computers, notebook computers, tablet computers, smartphones, and the like.

The audio conference server 102, the web conference server 104, and the one or more conference participant terminals 106 may transmit and receive data to/from one another over a communication network 108. In some embodiments, the communication network 108 may include the Internet, one or more local area networks, wide area networks, cellular networks, mobile networks, other types of networks, and combinations thereof.

In one embodiment, the web conference server 104 provides the conference participant terminals 106 with an access link to the web conference and acquires identification information of each conference participant terminal 106 that accesses the web conference through the access link.

The audio conference server 102 may receive a call originated from the conference participant terminal 106 or originates a call to the conference participant terminal 106, thereby processing an audio conference connection of the conference participant terminal 106. Then, the audio conference server 102 provides the web conference server 104 with the identification information of the conference participant terminal 106 that accesses the audio conference. In one embodiment, the identification information of the conference participant terminal 106 may include all types of information necessary for the audio conference server 102 to identify the conference participant terminal 106, such as an outgoing phone number of the conference participant terminal 106, network identification information (voice over Internet protocol (VoIP) identification number and the like) of the conference participant terminal 106, personal identification number (PIN), and the like. In another embodiment, the identification information of the conference participant terminal 106 may be a unique value assigned by the web conference server 104 in the process of accessing the web conference server 104 by the conference participant terminal 106.

Thereafter, the web conference server 104 compares the identification information acquired from each conference participant terminal 106 and the identification information provided from the audio conference server 102 and map web conference participant information and audio conference participant information.

In one embodiment, the web conference server 104 may provide the conference participant terminal 106 with audio conference access information, and the conference participant terminal 106 may use the provided audio conference access information (a call-in method based on the audio conference server 102) to originate a call for connecting to audio conference. In this case, the audio conference access information may include an access phone number for the audio conference. According to one embodiment, the web conference server 104 may provide the conference participant terminal 106 with the audio conference access information together with the access link to the web conference.

In another embodiment, the web conference server 104 provides the conference participant terminal 106 with the access link to the web conference and acquires identification information of the conference participant terminal 106 from the conference participant terminal 106 that accesses the web conference through the access link. Then, the web conference server 104 provides the audio conference server 102 with the acquired identification information of the conference participant terminal 106.

The audio conference server 102 may originate a call to the conference participant terminal 106 using the identification information received from the web conference server 104 and processes an audio conference connection of the conference participant terminal 106 which receives the call (a call-out method based on the audio conference server 102). Then, the audio conference server 102 provides the web conference server 104 with the identification information of the conference participant terminal 106 connected to the audio conference.

Then, the web conference server 104 compares the identification information acquired from the conference participant terminal 106 with the identification information provided from the audio conference server 102 and maps the web conference participant information and the audio conference participant information. As described in the above embodiment, the identification information of the conference participant terminal 106 may include all types of information necessary for the audio conference server 102 to identify the conference participant terminal 106, such as an outgoing phone number of the conference participant terminal 106, network identification information (VoIP identification number and the like) of the conference participant terminal 106, PIN, and the like.

In the disclosed embodiments, the audio conference server 102, the web conference server 104, and the one or more conference participant terminals 106 may be implemented on a computing device including one or more processors and a computer-readable recording medium connected to the one or more processors. The computer-readable recording medium may be present inside or outside of the processors and may be connected to the processors by various well-known means. The processors present inside the computing device may allow each computing device to operate according to exemplary embodiments described herein. For example, the processors may execute an instruction stored in the computer-readable recording medium, and the instruction stored in the computer-readable recording medium may be configured to allow the computing device to execute operations according to the exemplary embodiments described herein when executed by the processors.

Hereinafter, a conference connection handling process in the conference system 100 having the above configuration will be described in detail.

Figure 2:
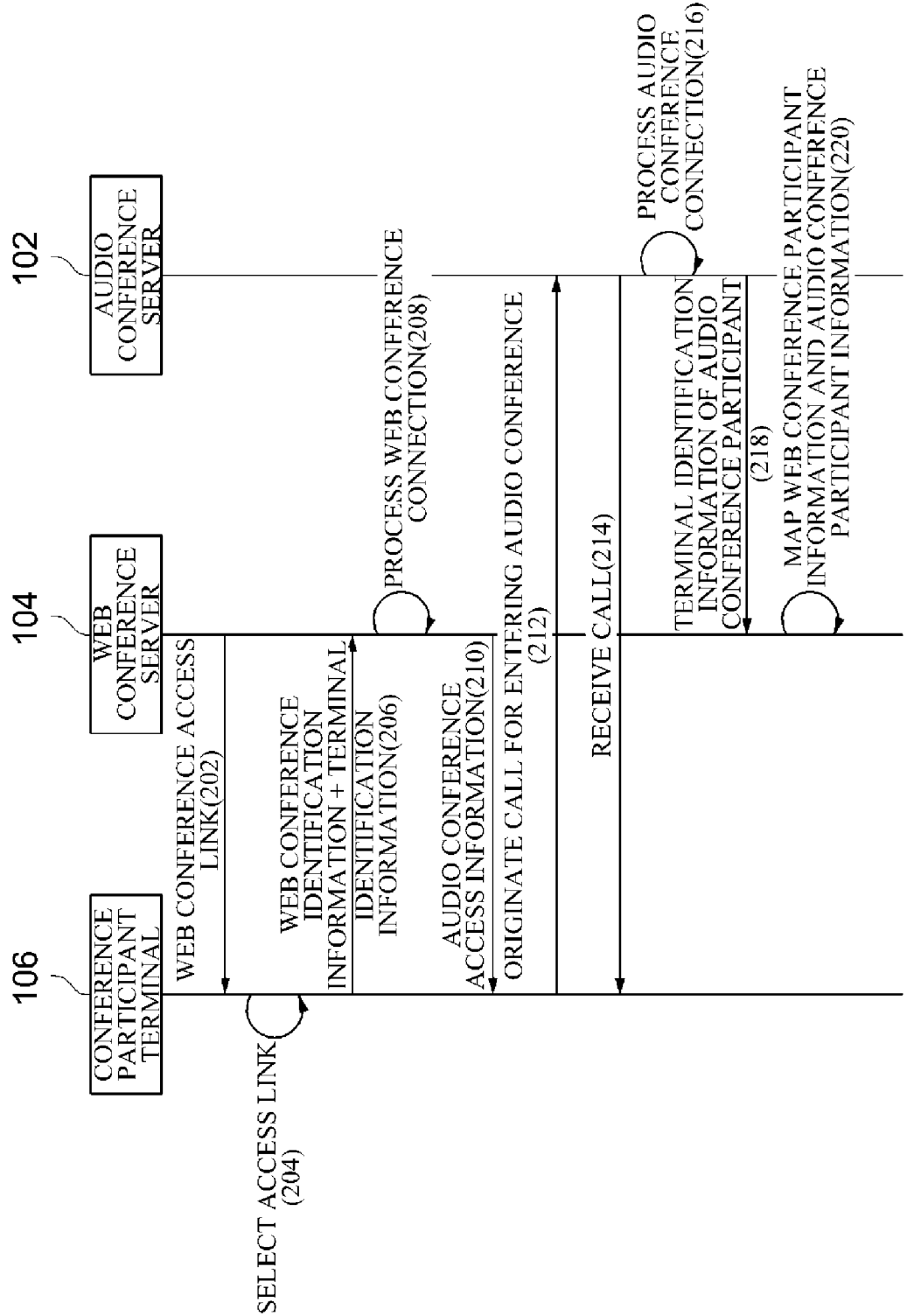
FIG. 2 is a flowchart for describing a process of handling audio conference and web conference connections of a conference participant terminal in a conference system according to one embodiment of the present disclosure.

FIG. 2 is a flowchart for describing a process 200 of handling audio conference and web conference connections of a conference participant terminal 106 in a conference system 100 according to one embodiment of the present disclosure. In the illustrated flowchart, the process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 202, a web conference server 104 provides the conference participant terminal 106 with an access link to a web conference. In one embodiment, the access link to the web conference may be transmitted to the conference participant terminal 106 from the web conference server 104 in the form of a short message service (SMS) message, an e-mail, a push message, or the like. The access link to the web conference may include pieces of information necessary for the conference participant terminal 106 to access the web conference, such as a uniform resource locator (URL) of the web conference server 104, identification information of the web conference, and the like.

In operation 204, a user (conference attendee) of the conference participant terminal 106 selects the access link received in operation 202. In one embodiment, the user may select the access link by touching the access link or clicking the access link using an input means, such as a mouse, a touchpad, or the like.

In operation 206, the conference participant terminal 106 transmits the identification information of the web conference included in the access link and the identification information of the conference participant terminal 106 to the web conference server 104. As described above, the identification information of the conference participant terminal 106 may include all types of information necessary for the audio conference server 102 to identify the conference participant terminal 106, such as an outgoing phone number of the conference participant terminal 106, network identification information (VoIP identification number and the like) of the conference participant terminal 106, PIN, and the like.

In operation 208, the web conference server 104 performs a web conference connection procedure of the conference participant terminal 106.

In operation 210, the web conference server 104 transmits audio conference access information to the conference participant terminal 106 that accesses the web conference. The audio conference access information may be, for example, a phone number or network access information for connecting to audio conference.

In operation 212, the conference participant terminal 106 originates a call for connecting to the audio conference using the received audio conference access information (call-in method). The conference participant terminal 106 may be configured to automatically originate the call upon receiving the audio conference access information or display the access information to the user and then originate the call according to the selection of the user.

In operation 214, the audio conference server 102 receives the call originated from the conference participant terminal 106.

In operation 216, the audio conference server 102 performs an audio conference connection procedure of the conference participant terminal 106.

In operation 218, the audio conference server 102 transmits the identification information of the conference participant terminal 106 connected to audio conference to the web conference server 104. The identification information may be included in the call originated in operation 214 and transmitted to the audio conference server 102.

In operation 220, the web conference server 104 compares the identification information received in operation 206 with the identification information received in operation 218 and maps the web conference participant information and the audio conference participant information. That is, the web conference server 104 compares the identification information of the terminal connected to web conference and the identification information of the terminal connected to audio conference and maps the terminals having the same identification information to each other to be identified as the same terminal.

Figure 3:
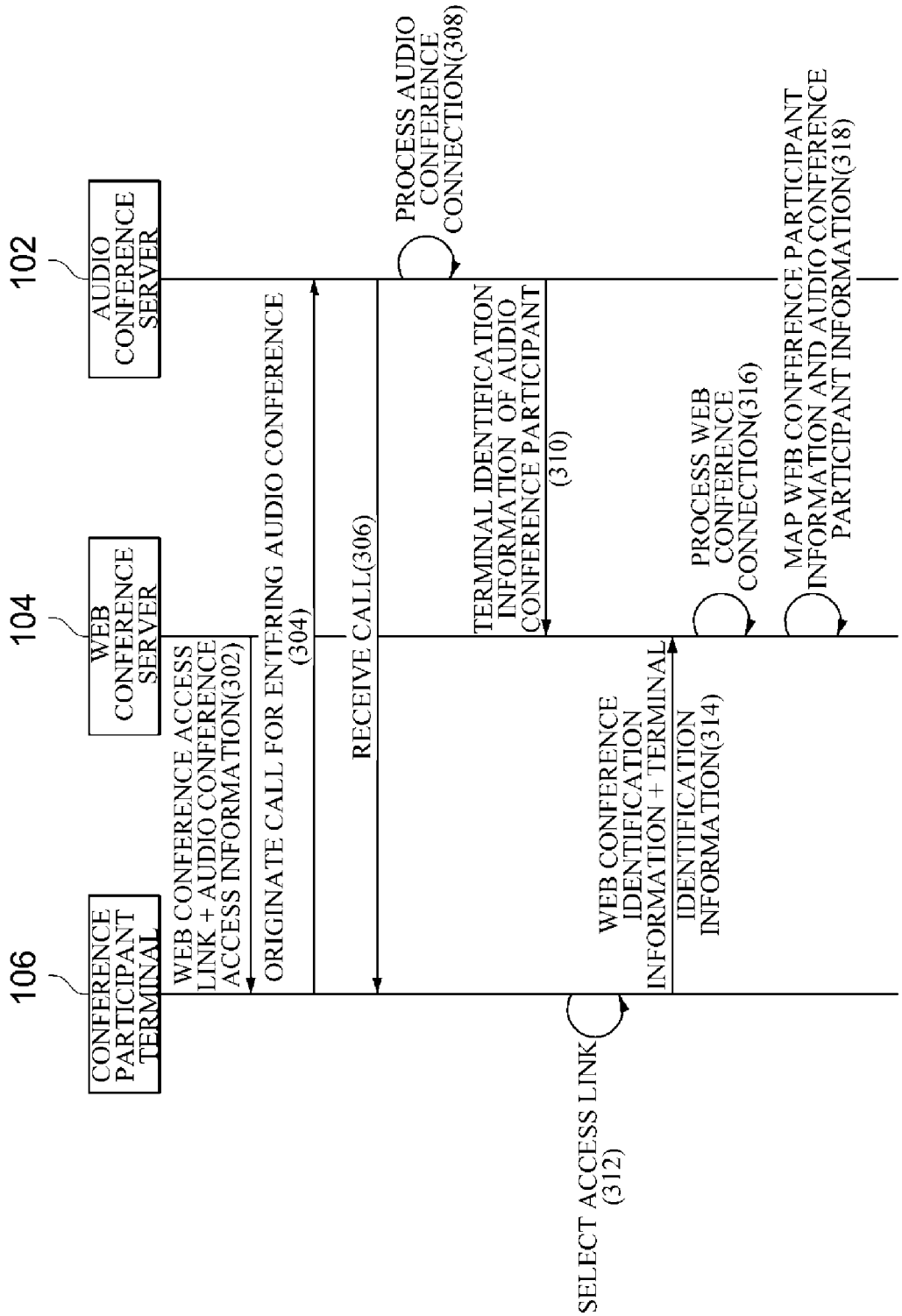
FIG. 3 is a flowchart for describing a process of handling audio conference and web conference connections of a conference participant terminal in a conference system according to another embodiment of the present disclosure.

FIG. 3 is a flowchart for describing a process 300 of handling audio conference and web conference connections of a conference participant terminal 106 in a conference system 100 according to another embodiment of the present disclosure. In the illustrated flowchart, the process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 302, a web conference server 104 provides the conference participant terminal 106 with an access link to a web conference. In one embodiment, the access link to the web conference may be transmitted to the conference participant terminal 106 from the web conference server 104 in the form of an SMS message, an e-mail, a push message, or the like. The access link to the web conference may include pieces of information necessary for the conference participant terminal 106 to access the web conference, such as a URL of the web conference server 104, identification information of the web conference, and the like.

Meanwhile, in the present embodiment, the web conference server 104 is configured to transmit audio conference access information in addition to the access link to the web conference in operation 302. The audio conference access information may be included in the web conference access link or may be transmitted to the conference participant terminal 106 via a message separate from the access link. As described above, the audio conference access information may be, for example, a phone number or network access information for connecting to audio conference.

In operation 304, the conference participant terminal 106 originates a call for connecting to the audio conference using the received audio conference access information (call-in method). The conference participant terminal 106 may be configured to automatically originate the call upon receiving the audio conference access information or display the access information to the user and then originate the call according to the selection of the user.

In operation 306, the audio conference server 102 receives the call originated from the conference participant terminal 106.

In operation 308, the audio conference server 102 performs an audio conference connection procedure of the conference participant terminal 106.

In operation 310, the audio conference server 102 transmits identification information of the conference participant terminal 106 connected to the audio conference to the web conference server 104. The identification information may be included in the call originated in operation 304 and transmitted to the audio conference server 102.

Meanwhile, in operation 312, a user (conference attendee) of the conference participant terminal 106 selects the access link received in operation 302. In one embodiment, the user may select the access link by touching the access link or clicking the access link using an input means, such as a mouse, a touchpad, or the like. Operation 312 may be performed simultaneously with operation 304, or may be performed before or after operation 304.

In operation 314, the conference participant terminal 106 transmits the identification information of the web conference included in the access link and the identification information of the conference participant terminal 106 to the web conference server 104. As described above, the identification information of the conference participant terminal 106 may include all types of information necessary for the audio conference server 102 to identify the conference participant terminal 106, such as an outgoing phone number of the conference participant terminal 106, network identification information (VoIP identification number and the like) of the conference participant terminal 106, PIN, and the like.

In operation 316, the web conference server 104 performs a web conference connection procedure of the conference participant terminal 106.

In operation 318, the web conference server 104 compares the identification information received in operation 310 with the identification information received in operation 314 and maps the web conference participant information and the audio conference participant information. That is, the web conference server 104 compares the identification information of the terminal connected to the web conference and the identification information of the terminal connected to the audio conference and maps the terminals having the same identification information to each other to be identified as the same terminal.

Figure 4:
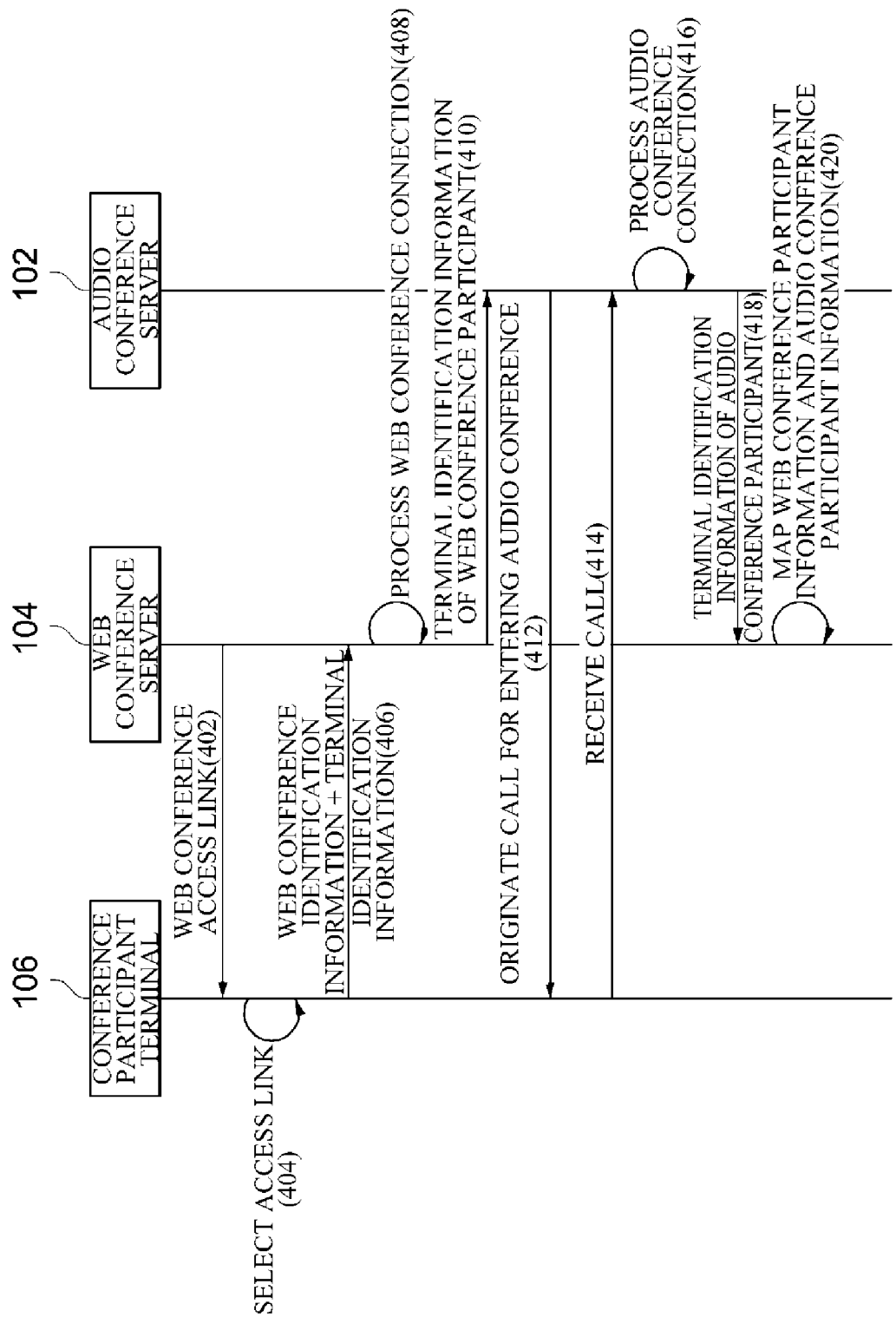
FIG. 4 is a flowchart illustrating a process of handling audio conference and web conference connections of a conference participant terminal in a conference system according to still another embodiment of the present disclosure.

FIG. 4 is a flowchart illustrating a process 400 of handling audio conference and web conference connections of a conference participant terminal 106 in a conference system 100 according to still another embodiment of the present disclosure. In the illustrated flowchart, the process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 402, a web conference server 104 provides the conference participant terminal 106 with an access link to a web conference. In one embodiment, the access link to the web conference may be transmitted to the conference participant terminal 106 from the web conference server 104 in the form of an SMS message, an e-mail, a push message, or the like. The access link to the web conference may include pieces of information necessary for the conference participant terminal 106 to access the web conference, such as a URL of the web conference server 104, identification information of the web conference, and the like.

In operation 404, a user (conference attendee) of the conference participant terminal 106 selects the access link received in operation 402. In one embodiment, the user may select the access link by touching the access link or clicking the access link using an input means, such as a mouse, a touchpad, or the like.

In operation 406, the conference participant terminal 106 transmits the identification information of the web conference included in the access link and the identification information of the conference participant terminal 106 to the web conference server 104. As described above, the identification information of the conference participant terminal 106 may include all types of information necessary for the audio conference server 102 to identify the conference participant terminal 106, such as an outgoing phone number of the conference participant terminal 106, network identification information (VoIP identification number and the like) of the conference participant terminal 106, PIN, and the like.

In operation 408, the web conference server 104 performs a web conference connection procedure for the conference participant terminal 106.

In operation 410, the web conference server 104 transmits the identification information of the conference participant terminal 106 connected to the web conference to the audio conference server 102.

In operation 412, the audio conference server 102 originates a call for connecting to the audio conference to the conference participant terminal 106 (call-out method).

In operation 414, the conference participant terminal 106 receives the call originated from the audio conference server 102.

In operation 416, the audio conference server 102 performs an audio conference connection procedure of the conference participant terminal 106.

In operation 418, the audio conference server 102 transmits the identification information of the conference participant terminal 106 connected to the audio conference to the web conference server 104.

In operation 420, the web conference server 104 compares the identification information received in operation 406 with the identification information received in operation 418 and maps the web conference participant information and the audio conference participant information. That is, the web conference server 104 compares the identification information of the terminal connected to web conference and the identification information of the terminal connected to audio conference and maps the terminals having the same identification information to each other to be identified as the same terminal.

Figure 5:
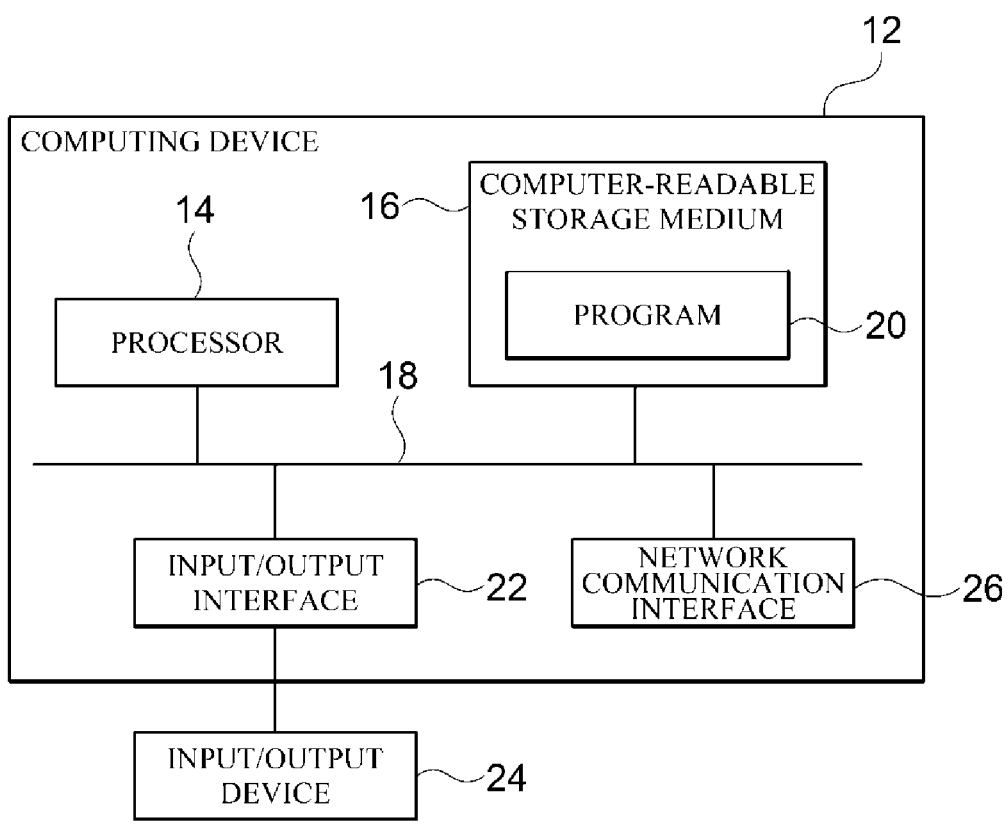
FIG. 5 is a block diagram for describing an example of a computing environment 10 including a computing device suitable to be used in exemplary embodiments.

FIG. 5 is a block diagram for describing an example of a computing environment 10 including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an audio conference server 102. In addition, the computing device 12 may be a web conference server 104, a host terminal 106 or at least one general conferee terminal 108. The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, an attendee who wishes to access a conference is allowed to connect to both an audio conference and a web conference with a single action by linking accesses to each of the audio conference and the web conference to each other, and a conference system is also allowed to map two pieces of access information, regarding accesses to each of the audio conference and the web conference through different paths, to the same user. Accordingly, a user can recognize the audio conference and the web conference as if they were a single service, and thereby the convenience and usability of conference users can be improved.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for handling a conference connection, the method comprising:
   providing, at a web conference server, a terminal with an access link to a web conference;
   acquiring, at the web conference server, identification information of the terminal from the terminal connected to the web conference through the access link;
   processing, at an audio conference server, a connection of the terminal to an audio conference;
   receiving, at the web conference server, identification information of the terminal connected to the audio conference from the audio conference server; and
   mapping, at the web conference server, participant information of the web conference and participant information of the audio conference by comparing the identification information received from the terminal with the identification information received from the audio conference server,
   wherein the processing of the connection to the audio conference processes the connection of the terminal to the audio conference by receiving a call originated from the terminal or by originating a call to the terminal using the identification information of the terminal received from the web conference server.

2. The method of claim 1, wherein the identification information of the terminal includes one or more of a phone number, network access information, or a personal identification number (PIN) of the terminal.

3. The method of claim 1, further comprising,
   when the processing of the connection to the audio conference processes the connection of the terminal to the audio conference by receiving the call originated from the terminal, prior to receiving the identification information of the terminal, providing access information of the audio conference to the terminal,
   wherein the processing of the connection to the audio conference processes the connection of the terminal to the audio conference by the terminal originating the call for connecting to the audio conference using the access information of the audio conference.

4. The method of claim 3, wherein the access information of the audio conference includes one or more of an access phone number or network access information of the audio conference.

5. The method of claim 3, wherein the access information of the audio conference is provided to the terminal together with the access link to the web conference.

6. A method for handling a conference connection which is performed in a web conference server comprising one or more processors and a memory in which one or more programs to be executed by the one or more processors are stored, the method comprising:
   providing a first terminal with an access link to a web conference;
   receiving identification information of the first terminal from the first terminal that is connected to the web conference through the access link;
   receiving identification information of a second terminal connected to an audio conference from an audio conference server; and
   mapping the first terminal and the second terminal to each other to be identified as the same terminal when the identification information of the first terminal is the same as the identification information of the second terminal, wherein the method further comprises, prior to receiving the identification information of the second terminal, providing access information of the audio conference to the first terminal, and wherein the access information of the audio conference includes one or more of an access phone number or network access information of the audio conference.

7. The method of claim 6, wherein pieces of identification information of the first terminal and the second terminal include one or more of phone numbers, network access information, and personal identification numbers (PINs) of the first terminal and the second terminal.

8. The method of claim 6, wherein the access information of the audio conference is provided to the first terminal together with the access link to the web conference.

9. The method of claim 6, further comprising, prior to receiving the identification information of the second terminal, transmitting the received identification information of the first terminal to the audio conference server.

10. A conference system comprising:
a web conference server configured to provide a terminal with an access link to a web conference and acquire identification information of the terminal from the terminal connected to the web conference through the access link; and
an audio conference server configured to process a connection of the terminal to an audio conference and provide the identification information of the terminal connected to the audio conference to the web conference server, wherein
the web conference server is further configured to map participant information of the web conference and participant information of the audio conference by comparing the identification information acquired from the terminal with the identification information provided from the audio conference server, and
the audio conference server is further configured to process the connection of the terminal to the audio conference by receiving a call originated from the terminal or by originating a call to the terminal using the identification information of the terminal received from the web conference server.

11. The conference system of claim 10, wherein the identification information of the terminal includes one or more of a phone number, network access information, and a personal identification number (PIN) of the terminal.

12. The conference system of claim 10, wherein
the web conference server is further configured to, when the audio conference server processes the connection of the terminal to the audio conference by receiving the call originated from the terminal, provide the terminal with the access information of the audio conference, and
the audio conference server is further configured to process the connection of the terminal to the audio conference by receiving the call for connecting to the audio conference originating from the terminal using the access information of the audio conference.

13. The conference system of claim 12, wherein the access information of the audio conference includes one or more of an access phone number and network access information of the audio conference.

14. The conference system of claim 12, wherein the web conference server provides the access information of the audio conference to the terminal together with the access link to the web conference.

15. A web conference server device comprising:
one or more processors;
a memory; and
one or more programs, wherein the one or more programs are configured to be stored in the memory and executed by the one or more processors and the one or more programs include:
a command for providing a first terminal with an access link to a web conference;
a command for receiving identification information of the first terminal from the first terminal connected to the web conference through the access link;
a command for receiving identification information of a second terminal connected to an audio conference from an audio conference server; and
a command for mapping the first terminal and the second terminal to each other to be identified as the same terminal when the identification information of the first terminal is the same as the identification information of the second terminal,
wherein the one or more programs further include a command for providing access information of the audio conference to the first terminal prior to performing the command for receiving the identification information of the second terminal, and
wherein the access information of the audio conference includes one or more of an access phone number and network access information of the audio conference.

16. The web conference server device of claim 15, wherein pieces of identification information of the first terminal and the second terminal include one or more of phone numbers, network access information, or personal identification numbers (PINs) of the first terminal and the second terminal.

17. The web conference server device of claim 15, wherein the access information of the audio conference is provided to the first terminal together with the access link to the web conference.

18. The web conference server device of claim 15, wherein the one or more programs further include a command for transmitting the received identification information of the first terminal to the audio conference server prior to performing the command for receiving the identification information of the second terminal.

* * * * *